US010891253B2

(12) United States Patent
Raindel et al.

(10) Patent No.: US 10,891,253 B2
(45) Date of Patent: Jan. 12, 2021

(54) MULTICAST APPARATUSES AND METHODS FOR DISTRIBUTING DATA TO MULTIPLE RECEIVERS IN HIGH-PERFORMANCE COMPUTING AND CLOUD-BASED NETWORKS

(71) Applicant: Microsoft Technology Licensing, LLC, Redmond, WA (US)

(72) Inventors: Shachar Raindel, Redmond, WA (US); Anirudh Badam, Redmond, WA (US); Jitendra Padhye, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 410 days.

(21) Appl. No.: 15/622,787

(22) Filed: Jun. 14, 2017

(65) Prior Publication Data
US 2018/0067893 A1  Mar. 8, 2018

Related U.S. Application Data

(60) Provisional application No. 62/384,866, filed on Sep. 8, 2016.

(51) Int. Cl.
*G06F 15/173* (2006.01)
*G06F 13/28* (2006.01)
*G06F 13/42* (2006.01)

(52) U.S. Cl.
CPC ........ *G06F 15/17331* (2013.01); *G06F 13/28* (2013.01); *G06F 13/287* (2013.01); *G06F 13/4282* (2013.01); *G06F 2213/0024* (2013.01)

(58) Field of Classification Search
CPC .... G06F 13/287; G06F 13/4282; G06F 13/28; G06F 15/17331; G06F 2213/0024; G06F 13/42; G06F 15/173

(Continued)

(56) References Cited

U.S. PATENT DOCUMENTS 7,509,419 B2 * 3/2009 Elnozahy ............. H04L 49/351
                                                          709/203
7,870,268 B2 * 1/2011 Beverly ............... H04L 69/163
                                                          709/228

(Continued)

FOREIGN PATENT DOCUMENTS

WO    WO-2008/057833 A2    5/2008

OTHER PUBLICATIONS

Jorjeta G. Jetcheva et al.; "Adaptive Demand-Driven Multicast Routing in Multi-Hop Wireless Ad Hoc Networks"; Carnegie Mellon University; Oct. 2001; pp. 33-44.

(Continued)

*Primary Examiner* — Moustafa M Meky
*Assistant Examiner* — Kidest Mendaye
(74) *Attorney, Agent, or Firm* — Schwegman Lundberg & Woessner, P.A.

(57) ABSTRACT

An originating host device in a distribution chain is provided upstream from multiple host devices including intermediary and terminating host devices. The originating host device includes a core with a generation application and a first RDMA NIC. The core: determines a plan for transferring data between the originating host device and the other host devices; and generates WQEs to implement the plan. The first RDMA NIC includes a read application, a descriptor application, and a reception application. The read application is configured such that the first RDMA NIC reads the WQEs from a first memory. The descriptor application is configured such that the first RDMA NIC: writes a portion of the WQEs directly from the first RDMA NIC to a second memory of the intermediary host device; and triggers a second RDMA NIC of the intermediary host device to process the portion of the WQEs stored in the second memory.

8 Claims, 9 Drawing Sheets

(58) Field of Classification Search
USPC .......................................................... 709/212
See application file for complete search history.

(56) References Cited

U.S. PATENT DOCUMENTS

| | | | |
|---|---|---|---|
| 10,193,758 B2* | 1/2019 | Chen | H04L 67/2876 |
| 2002/0133622 A1 | 9/2002 | Pinto | |
| 2003/0118053 A1 | 6/2003 | Edsall et al. | |
| 2006/0010264 A1* | 1/2006 | Rader | B65H 35/0013 |
| | | | 710/23 |
| 2006/0087989 A1 | 4/2006 | Gai et al. | |
| 2006/0235977 A1 | 10/2006 | Wunderlich et al. | |
| 2007/0041383 A1* | 2/2007 | Banikazemi | H04L 67/06 |
| | | | 370/395.3 |
| 2008/0109573 A1* | 5/2008 | Leonard | G06F 13/28 |
| | | | 710/24 |
| 2010/0023626 A1 | 1/2010 | Hussain et al. | |
| 2011/0078410 A1* | 3/2011 | Blackmore | G06F 15/17375 |
| | | | 712/30 |
| 2012/0195310 A1 | 8/2012 | Cafiero et al. | |
| 2013/0279378 A1* | 10/2013 | Niea | H04B 3/36 |
| | | | 370/293 |
| 2014/0359044 A1 | 12/2014 | Davis et al. | |
| 2015/0281126 A1 | 10/2015 | Regula et al. | |
| 2015/0317280 A1* | 11/2015 | Magro | G06F 15/17331 |
| | | | 710/301 |
| 2016/0034418 A1* | 2/2016 | Romem | G06F 3/0604 |
| | | | 709/212 |
| 2017/0286363 A1* | 10/2017 | Joshua | H04L 69/08 |
| 2017/0302526 A1* | 10/2017 | Chen | H04L 67/1097 |
| 2018/0336362 A1* | 11/2018 | Guttmann | H04L 63/102 |

OTHER PUBLICATIONS

Yanpei Chen et al.; "Understanding TCP Incest Throughput Collapse in Datacenter Networks"; Aug. 21, 2009; 10 pages.
Davide Rossetti et al.; "State of GPUDirect Technologies"; Apr. 4-7, 2016; 25 pages.
Joachim Worringen; "Pipelining and Overlapping for MPI Collective Operations"; Oct. 2003; 10 pages.
Jelena Pjesivac-Grbovic et al.; "Performance Analysis of MPI Collective Operations"; Apr. 2005; 25 pages.
Christopher Mitchell et al.; "Using One-Sided RDMA Reads to Build a Fast, CPU-Efficient Key-Value Store"; USENIX Annual Technical Conference; Jun. 2013; 12 pages.
Sushmitha P. Kini efal.; "Fast and Scalable Barrier Using RDMA and Multicast Mechanisms for InfiniBand-Based Clusters"; Dept. of CIS; The Ohio State University, Columbus, OH.; Sep. 2003; 10 pages.
"International Serial No. PCT/US2017/050753, International Search Report dated Nov. 30, 2017", 4 pgs.
"International Serial No. PCT/US2017/050753, Written Opinion dated Nov. 30, 2017", 7 pgs.
"Office Action Issued in European Patent Application No. 17772175.0", dated Jan. 24, 2020, 6 Pages.

* cited by examiner

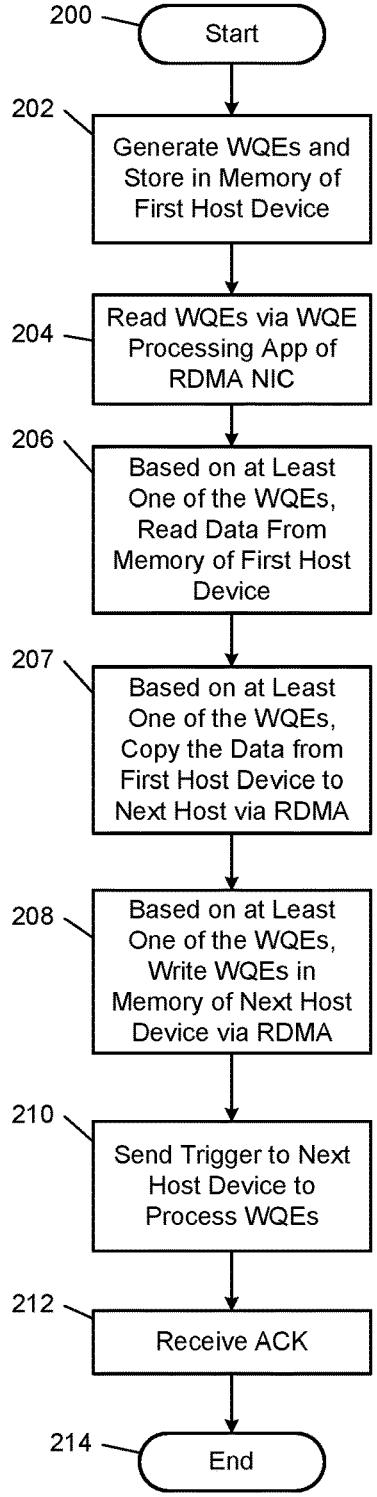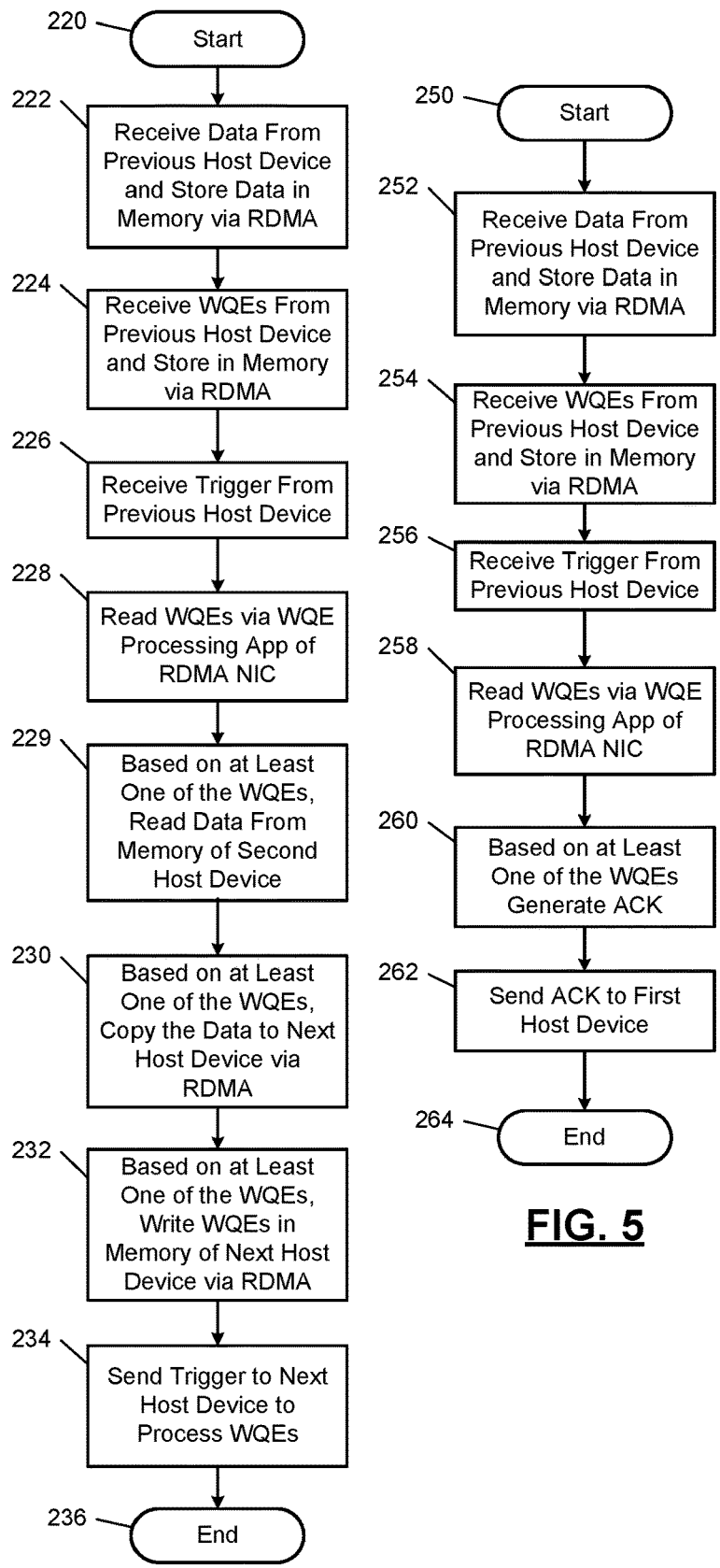

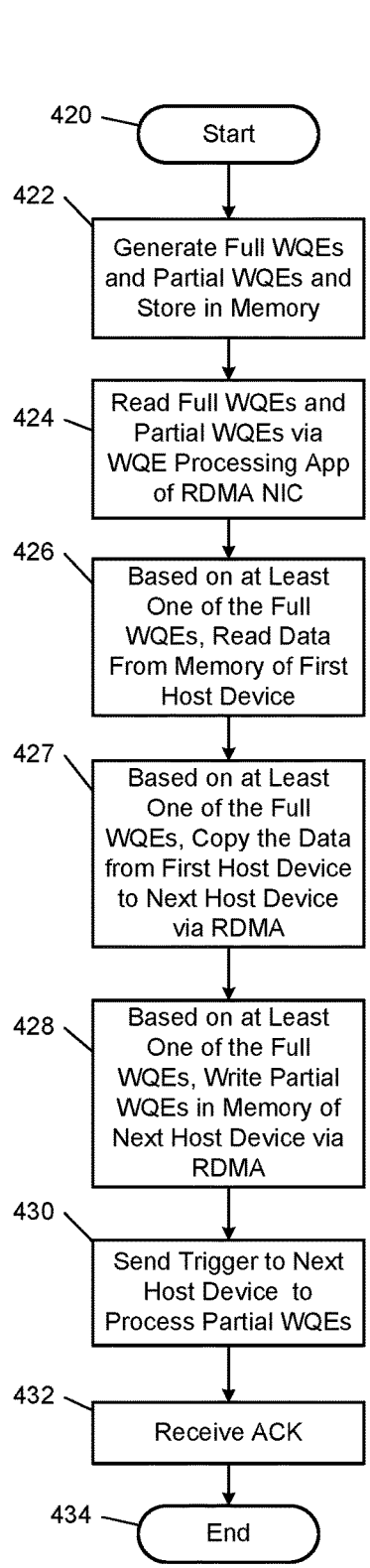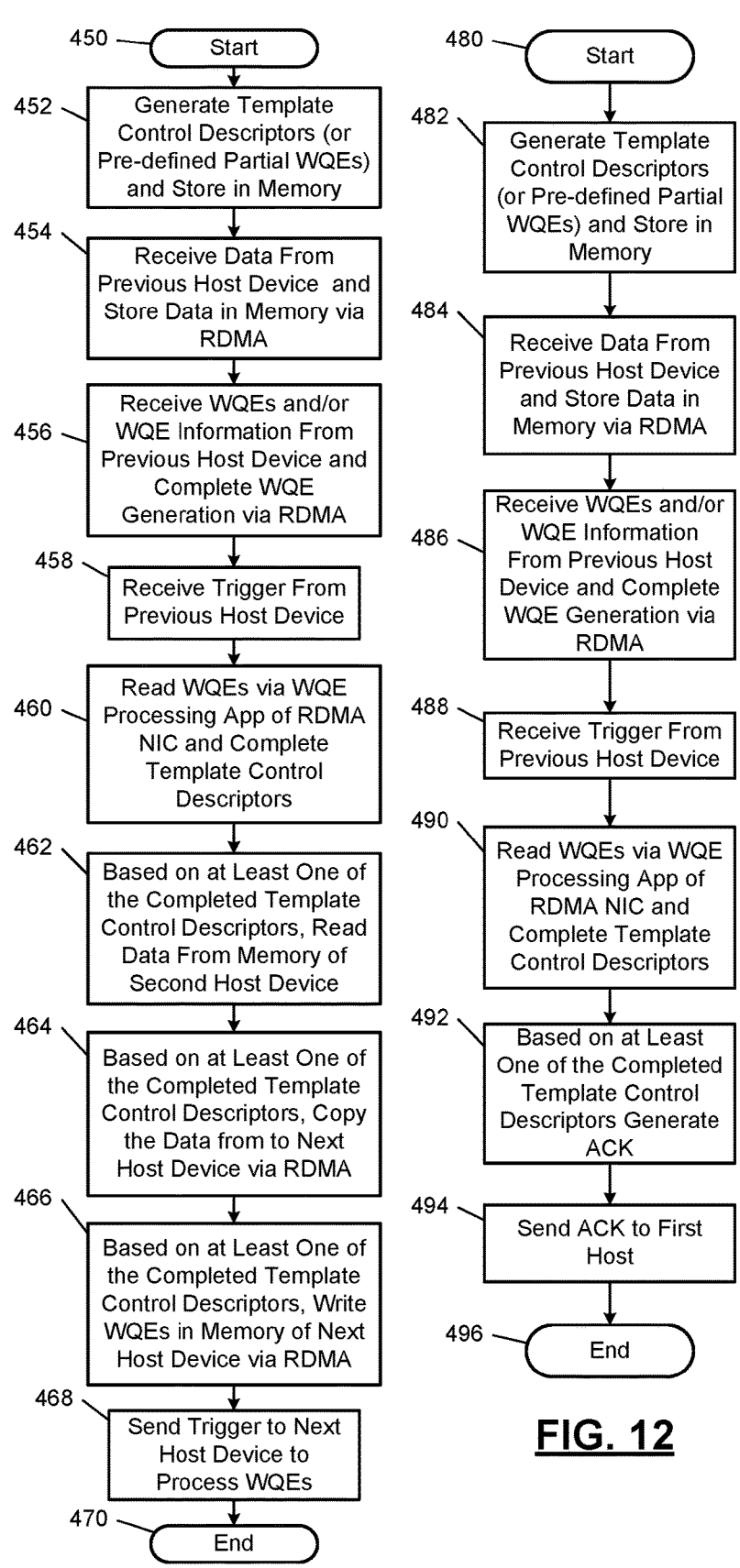

MULTICAST APPARATUSES AND METHODS FOR DISTRIBUTING DATA TO MULTIPLE RECEIVERS IN HIGH-PERFORMANCE COMPUTING AND CLOUD-BASED NETWORKS

CROSS-REFERENCE TO RELATED APPLICATIONS

This application claims the benefit of U.S. Provisional Application No. 62/384,866, filed on Sep. 8, 2016. The entire disclosure of the application referenced above is incorporated herein by reference.

FIELD

The present disclosure relates to high-performance computing networks and cloud-based networks, and more particularly to distribution of data between host devices in racks of a data center network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A cloud-based network (referred to herein as "a cloud") includes a data center having thousands of host servers. The host servers can be implemented in racks, where each rack includes a predetermined number of host servers, a router, one or more communication buses, one or more power supplies, and a power bus. In a single rack, data is routed between the host servers via the router over the one or more corresponding communication buses. Between racks, data can be routed via a distributed communication system, which may include the Internet, an Ethernet network, a wide area network, a local area network, and/or a virtual private network. Power is supplied from the power supplies to the host servers and the router via the power buses on the racks.

The same data can be transferred from a sending host server to any number of receiving host servers in the data center. The data can be sent using a multicast protocol, such as a transmission control protocol (TCP)/Internet protocol (IP). One problem with multicast transmission of data is that as the number of host servers to which the data is being sent increases and/or as sizes of groups of the host servers increases, multicast transmission becomes similar to broadcast transmission. Broadcast transmission includes sending data to all or a large number of host servers within the data center. As a result, the number of host servers that are prevented from receiving the data is small or 0. For this reason, the sending host server has limited ability to prevent certain host servers from receiving the data when transmitting based on multicast protocols. When transmitting based on multicast protocols, the sending host server does not receive acknowledgements from the receiving host servers and thus is unaware of which ones of the host servers actually received the data. Since the sending host server is unaware of which of the host servers received the data, multicast transmission can be unreliable. Multicast transmission is also not easily scalable to reliably allow for transmission of data to a particular selected set of host devices.

As an alternative, the data can be sent from the sending host server to selected host servers using a unicast protocol. The sending host server sends the data to addresses of each of the selected host servers separately. The selected host servers then send acknowledgement (ACK) signals back to the sending host server indicating reception of the data. As a result, the sending host server is aware of which of the selected host servers received the data. The problem with using a unicast protocol is that the sending host server needs to generate a data transmission signal and receive a corresponding ACK signal for each of the selected host servers. This can create a bottleneck at the sending host server.

SUMMARY

An originating host device in a distribution chain upstream from multiple host devices is provided. The multiple host devices include an intermediary host device and a terminating host device. The originating host device includes a core and a first remote direct memory access (RDMA) network interface card (NIC). The core includes a generation application. The generation application is configured such that the core of the originating host device (i) determines a plan for transferring data between the originating host device and the other host devices, and (ii) generates work queue elements (WQEs) to implement the plan. The first RDMA NIC includes a read application, a descriptor application, and a reception application. The read application is configured such that the RDMA NIC reads the WQEs from a first memory. The descriptor application is configured such that the first RDMA NIC (i) remote direct memory accesses a second memory of the intermediary host device including writing a first portion of the WQEs directly from the first RDMA NIC to the second memory, and (ii) triggers a second RDMA NIC of the intermediary host device to process the first portion of the WQEs stored in the second memory. The reception application is configured such that the first RDMA NIC receives an acknowledgement signal or a portion of the data from the terminating host device, where the acknowledgement signal indicates transfer of the data is completed.

In other features, a first RDMA NIC of a first intermediary host device is provided, where the first intermediary host device is in a distribution chain downstream from an originating host device. The first RDMA NIC includes a memory circuit, a read application, and a descriptor application. The read application is stored in the memory circuit and is configured such that the first RDMA NIC receives WQEs from (i) a first memory of the first intermediary host device, or (ii) a second RDMA NIC of the originating host device or a second intermediary host device. The WQEs include instructions for transferring data. The descriptor application is stored in the memory circuit and configured such that the first RDMA NIC (i) remote direct memory accesses a second memory of a third intermediary host device or a terminating host device including writing a first portion of the WQEs directly from the first RDMA NIC of the first intermediary host device to the second memory, and (ii) triggers a third RDMA NIC of the third intermediary host device or the terminating host device to process the first portion of the WQEs stored in the second memory to (a) copy the data, (b) send an acknowledgement signal to the originating host device, or (c) transfer a first portion of the data to the originating host device.

In other features, a first RDMA NIC of a terminating host device is provided. The terminating host device is at an end of a distribution chain and downstream from an originating host device. The distribution chain includes host devices. The host devices include the originating host device, an intermediary host device and the terminating host device. The first RDMA NIC includes a memory circuit, a read application and an acknowledgement application. The read application is stored in the memory circuit and configured such that the first RDMA NIC receives: data from the intermediary host device; and WQEs from (i) a first memory of the terminating host device, or (ii) a second RDMA NIC of the intermediary host device. The intermediary host device is upstream from the terminating host device. The WQEs originated at the originating host device. The acknowledgement application is stored in the memory circuit and is configured such that the first RDMA NIC sends an acknowledgement signal to a third RDMA NIC of the originating host device indicating a last hop has been reached in the distribution chain and distribution of the data to the host devices is completed.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF DRAWINGS

FIG. 3 illustrates a portion of a first data transfer method implemented by a sending host device originating a work queue element (WQE) transfer process in accordance with an embodiment of the present disclosure.

FIG. 4 illustrates another portion of the first data transfer method implemented by an intermediary host device in accordance with an embodiment of the present disclosure.

FIG. 5 illustrates another portion of the first data transfer method implemented by a terminating host device in accordance with an embodiment of the present disclosure.

FIG. 10 illustrates a portion of a second data transfer method implemented by a sending host device originating a partial WQE transfer process in accordance with an embodiment of the present disclosure.

FIG. 11 illustrates a portion of the second data transfer method implemented by an intermediary host device generating template control descriptors in accordance with an embodiment of the present disclosure.

FIG. 12 illustrates a portion of the second data transfer method implemented by a terminating host device in accordance with an embodiment of the present disclosure.

In the drawings, reference numbers may be reused to identify similar and/or identical elements.

DESCRIPTION

A sending host device of a datacenter may send data to a selected set of receiving host devices. Examples of host devices include a host server and a host computer. The data may be sent to host devices in a same rack as the sending host device or to host devices in other racks. The examples set forth below provide reliable techniques for efficiently transmitting the same data to multiple host devices while minimizing latency and bandwidth used at each host device. The examples also minimize and/or eliminate processing time of cores of central processors of receiving host devices.

Figure 1:
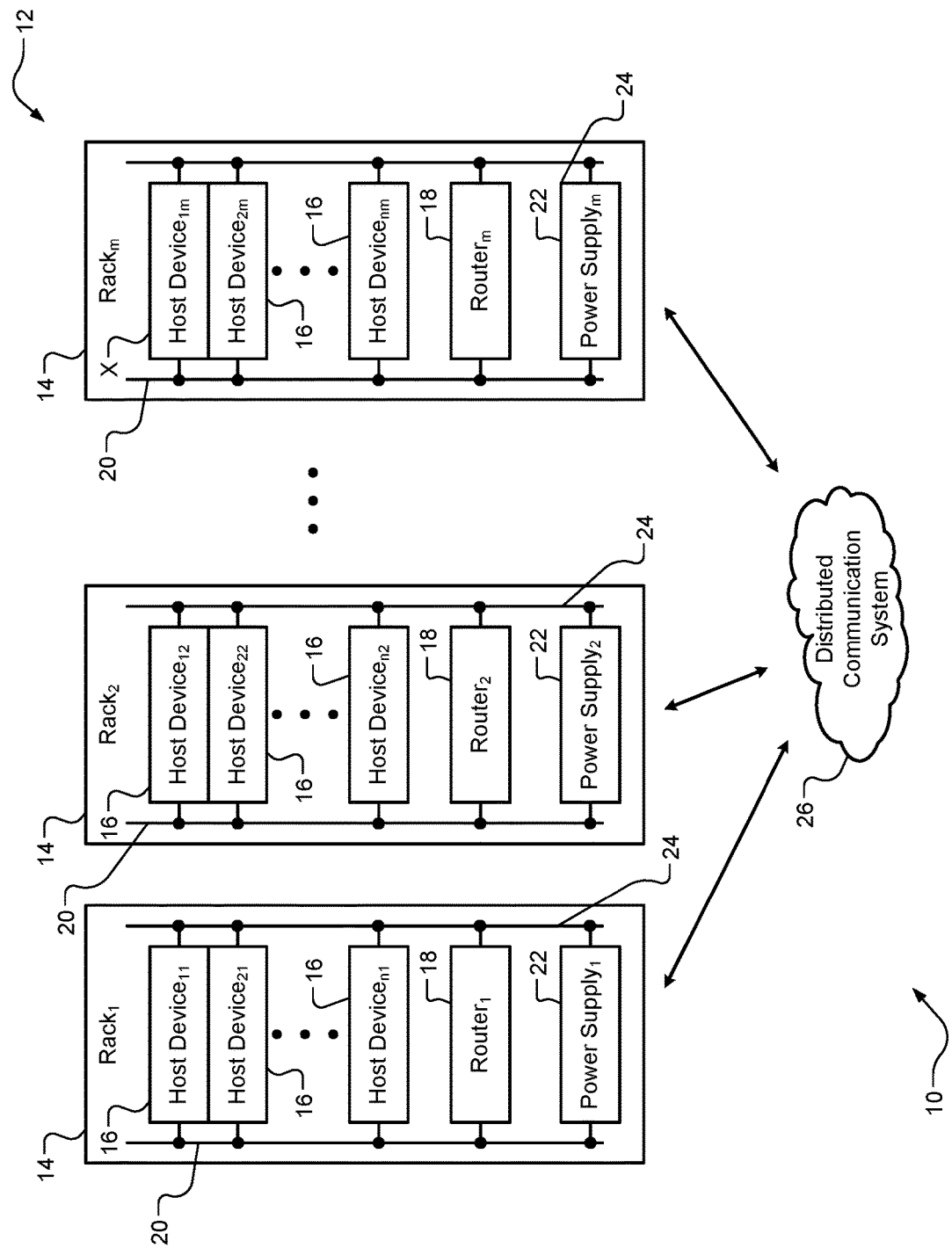
FIG. 1 is a functional block diagram of an example of a cloud-based network including a data center having host devices in accordance with an embodiment of the present disclosure.

FIG. 1 shows a cloud-based network (or cloud) 10 that includes a data center 12. The data center 12 includes racks 14. The data center 12 may include a high-performance computing network, such as an Infiniband® network or an Intel® OmniPath® network. Each of the racks 14 includes multiple host devices 16, a router 18, one or more communication buses 20, one or more power supplies 22, and one or more power buses 24. The router 18 routes signals including data, WQEs, messages (e.g., control messages, such as remote procedure call (RPC) messages), etc. between the host devices 16 via the communication buses 20 and a distributed communication system 26. The distributed communication system 26 may include a network, such as the Internet, an Ethernet network, a wide area network, a virtual private network, and/or a local area network. Each of the power supplies 22 may receive the utility power and include one or more batteries. The host devices 16 and the router 18 may receive the utility power and/or power from the batteries via the power buses 24. The batteries may be used to power the host devices 16 and the router 18 during a power outage when utility power is not available.

Figure 2:
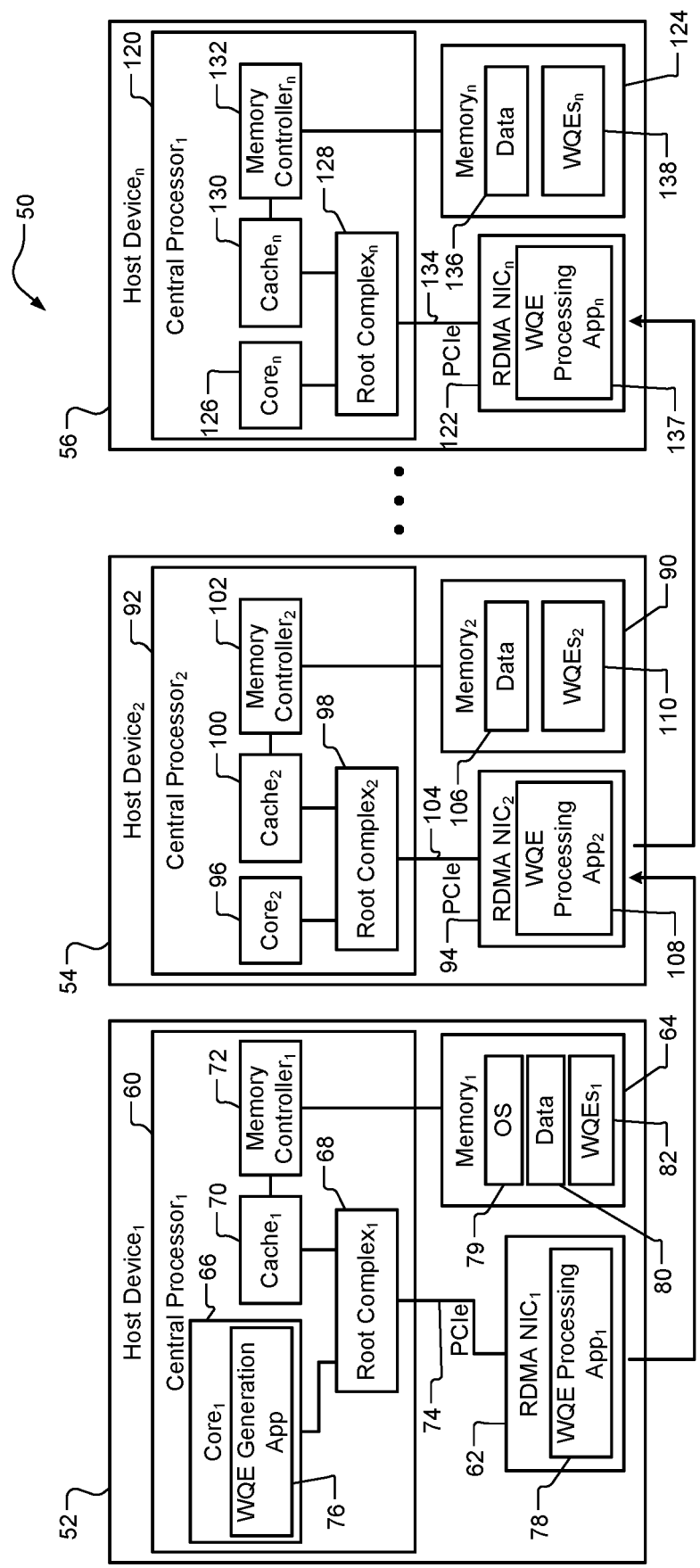
FIG. 2 is a functional block diagram of an example of host devices in a data chain in accordance with an embodiment of the present disclosure.
Figure 6:
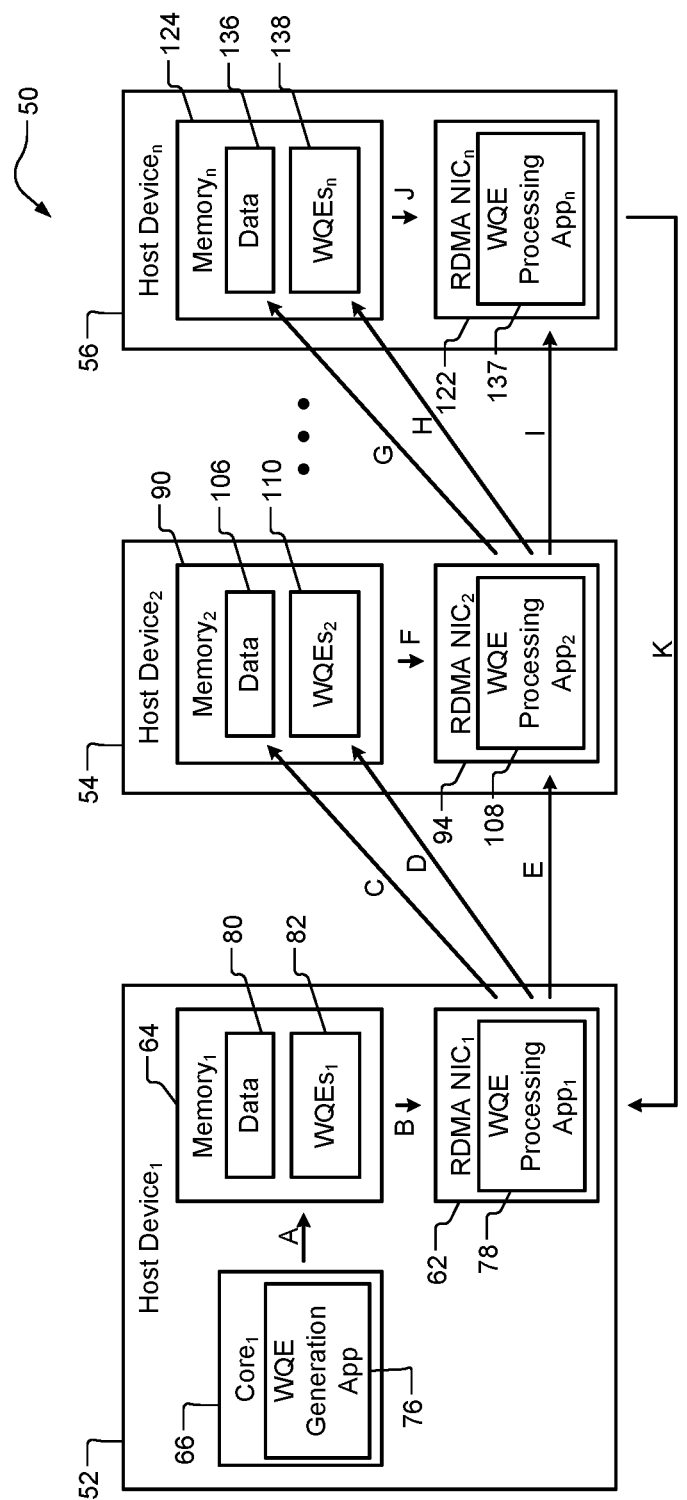
FIG. 6 is a functional block diagram of an example of host devices implementing the first data transfer method illustrated by FIGS. 3-5.
Figure 13:
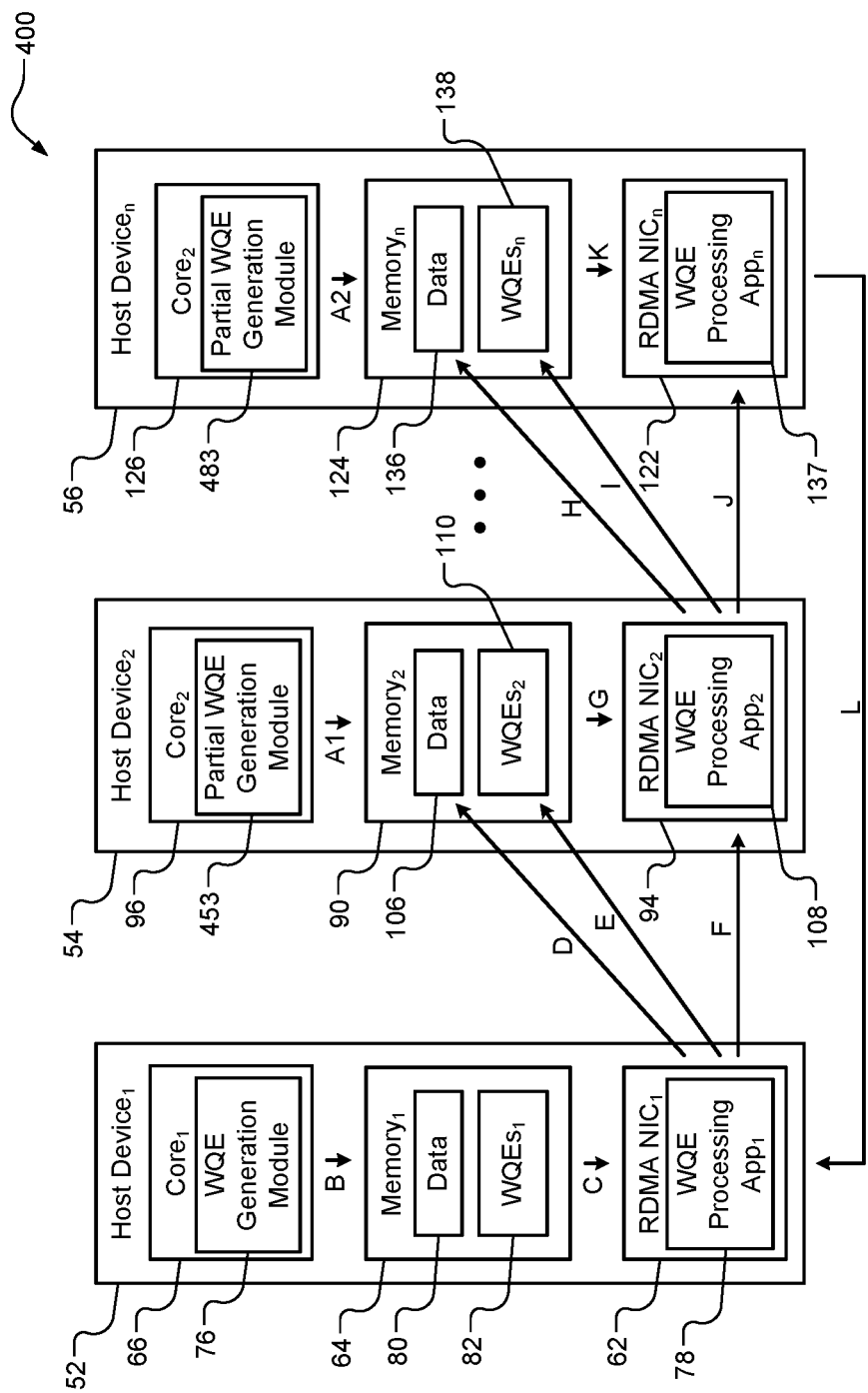
FIG. 13 is a functional block diagram of an example of a chain of host devices implementing the second data transfer method illustrated by FIGS. 10-12.

Examples of the host devices 16 are shown in FIGS. 2, 6 and 13. The host devices 16 implement transfer methods including remote direct memory access (RDMA) write methods, RDMA read methods, and message transfer methods disclosed herein.

FIG. 2 shows a data chain 50 including an originating host device 52, one or more intermediary host devices (one intermediary host device 54 is shown) and a terminating host device 56. The originating host device 52 originates a work queue element (WQE) transfer process and a data transfer process, which include transferring WQEs and data from the originating host device 52 to the other host devices 54, 56 in the chain in a serial manner.

The originating host device 52 includes a central processor 60, a RDMA network interface card (NIC) 62 and a memory 64. The central processor 60 includes a core 66, a root complex 68, a cache 70, and a memory controller 72. The root complex 68 routes data, WQEs, and messages (i) between the core 66 and the RDMA NIC 62 via a peripheral component interconnect express (PCIe) bus 74, (ii) between the core 66 and the cache 70, and (iii) between the RDMA NIC 62 and the cache 70. The cache 70 stores data, WQEs and messages prior to be stored in the memory 64 via the memory controller 72.

Figure 8:
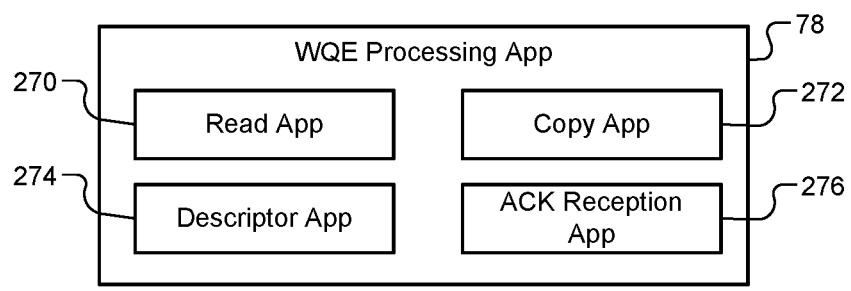
FIG. 8 is a functional block diagram of an example of a WQE processing application implemented by remote direct memory access (RDMA) network interface cards (NICs) of the host devices of FIGS. 2 and 6 in accordance with an embodiment of the present disclosure.

The core 66 includes a WQE generation application 76, which originates generation of WQEs. An example of a WQE is shown in FIG. 8. The RDMA NIC 62 includes a WQE processing application 78. The applications 76, 78 may be stored in memory circuits respectively in the core 66 and the RDMA NIC 62. The memory 64 includes an operating system (OS) 79, data 80 and WQEs 82. The operating system 79 is executed by the core 66. The WQE generation application 76 is executed by the core 66 while executing the operating system 79. The WQE processing application 78 receives generated WQEs and initiates data transfer events and WQE transfer events to the first intermediary host device 54. The data transfer events and WQE transfer events are performed according to RDMA protocols to directly store data and WQEs in a memory 90 of the first intermediary host device 54. As used herein "RDMA" refers to the transfer of data, WQEs and/or messages from a first host device to a memory of a second host device independent of a core of the second host device. The core of the second host device is bypassed, such that the transfer does not involve any processing by the core of the second host device.

The intermediary host device(s) include respective central processors, RDMA NICs and memories. As an example, a central processor 92, RDMA NIC 94 and the memory 90 of the first intermediary host device 54 are shown. The central processors include respective cores, root complexes, caches, and memory controllers. As an example, a core 96, root complex 98, cache 100, and memory controller 102 of the first intermediary host device 54 are shown. For the intermediary host device 54, the root complex 98 routes data, WQEs, and messages (i) between the core 96 and the RDMA NIC 94 via a PCIe bus 104, (ii) between the core 96 and the cache 100, and (iii) between the RDMA NIC 94 and the cache 100. The cache 100 stores data, WQEs and messages prior to being stored in the memory 90 via the memory controller 102. The other intermediary host devices may operate similarly to the intermediary host device 54.

The RDMA NIC of each of the intermediary host devices (i) receives data (e.g., data 106) from the originating host device or an upstream intermediary host device, and (ii) according to RDMA protocols, directly stores the data in the memory of the intermediary host device corresponding to that RDMA NIC. The core 96 is bypassed and thus is not involved in the storage of the data. The core 96 may also be bypassed for received and stored WQEs and messages. The RDMA NICs include respective WQE processing applications. As an example, a WQE processing application 108 of the intermediary host device 54 is shown and may be stored in a memory circuit in the RDMA NIC 94. Each of the WQE processing applications of the intermediary host devices (i) receives WQEs (e.g., WQEs 110) generated by the originating host device and received from either the originating host device or one of the intermediary host devices, and (ii) initiates data transfer events and WQE transfer events to a downstream one of the intermediary host devices or the terminating host device. The data transfer events and WQE transfer events are performed according to RDMA protocols to directly store data and WQEs in the memory of the downstream intermediary host device or the terminating host device.

The terminating host device 56 includes a central processor 120, a RDMA NIC 122 and a memory 124. The central processor 120 includes a core 126, a root complex 128, a cache 130, and a memory controller 132. The root complex 128 routes data, WQEs, and messages (i) between the core 126 and the RDMA NIC 122 via a PCIe bus 134, (ii) between the core 126 and the cache 130, and (iii) between the RDMA NIC 122 and the cache 130. The cache 130 stores data, WQEs and messages prior to being stored in the memory 124 via the memory controller 132.

The RDMA NIC 122 (i) receives data 136 from an intermediary host device upstream from the terminating host device 56, and (ii) according to RDMA protocols, directly stores the data in the memory 124. The core 126 is bypassed and thus is not involved in the storage of the data. The core 126 may also be bypassed for received and stored WQEs and messages. The RDMA NIC 122 includes a WQE processing application 137, which may be stored in a memory circuit in the RDMA NIC 122. The WQE processing application 137 (i) receives WQEs 138 generated by the intermediary host device upstream from the terminating host device 56, and (ii) generates an ACK signal acknowledging receipt of the data 136. The WQEs 138 are stored in the memory according to RDMA protocols.

The memories (e.g., the memories 64, 90, 124) of the host devices (e.g., the host devices 52, 54, 56) may be implemented as non-volatile memories, such as random access memories, dynamic random access memories, dual in-line memory modules (DIMMs), or other suitable non-volatile memories. The memories may include work queues in which the WQEs are stored and executed in a predetermined order. The WQEs may be executed in a first-in-first-out order or in an order indicated by the WQE generation application 76. The order of execution may be indicated in one or more of the WQEs. As an example, the WQEs may each have an order field including an order value for that WQE.

In operation, the originating host device 52 generates WQEs and transfers a first portion of the WQEs to a next (or first intermediary) one of the host devices in the chain. The first intermediary host device transfers a second portion (or subset of the first portion) of WQEs to a host device downstream from the first intermediary host device, such as a second intermediary host device or the terminating host device 56. This process is iteratively performed until WQEs are received at the terminating host device 56. The originating host device 52 also transfers data to the first intermediary host device, which then forwards the data to the host device downstream from the first intermediary host device. This process is also iteratively performed until the data is received at the terminating host device. In this manner, the originating host device 52 initiates the transfer of the WQEs and the data by transferring selected ones of the WQEs and the data to the first intermediary host device, but does not itself transfer the WQEs and the data to all of the intermediary host devices and the terminating host device 56. The data transfer events between successive host devices are performed based on the WQEs. This is further described below.

Data is distributed to multiple host devices to provide backup of the data should a failure occur at one or more of the host devices. The failure may be a power outage at the one or more host devices, a utility power outage at a rack, a failure in transmitting the data, or other failure preventing reliable access to the data at the one or more host devices. As an example, data may be copied to multiple host devices in each of multiple racks. Latency associated with transmitting data between racks can be greater than latency associated with transmitting data between host devices in a same rack. As an example, latency associated with transmitting data between host devices in different racks may be 6 microseconds (µs) and latency associated with transmitting data between host devices in a same rack may be 2 µs. This increased latency is due to more network hops being associated with transmitting data between racks than the number of hops being associated with transmitting data between host devices in a same rack.

Although FIGS. 2-3 show serial chains, distribution of data and WQEs may be performed according to a distribution tree. For example, the first host device 52 may transmit data and WQEs to multiple initial host devices (e.g., a second host device and a third host device) of respective chains. Each of the chains may have two or more host devices. The initial host devices may transfer the data and corresponding WQEs to next host devices in the corresponding chains. The data and WQEs are distributed downstream until ultimately being received at terminating host devices in the chains.

A distribution tree may be used to minimize latencies in reception of data and WQEs at host devices. A distribution tree is especially helpful in reducing latencies when data and WQEs are being transmitted to host devices in different racks. A distribution tree can be used to minimize number of hops between racks. For example, a host device A generates data for host devices B, C, D, E and host devices A, B, C are in a first rack, and host devices D, E are in a second rack. If host device A sends the data and corresponding WQEs to host devices B, D, and host devices B, D send the data and corresponding WQEs respectively to host devices C, E, then there is a single hop between the racks. If however data and WQEs are distributed in a serial manner from host device A to host device D then to Host device B then to host device E and finally to host device C, then four hops occur between the racks.

For further defined structure of the devices, modules, applications, and/or elements of the host devices 52, 54, 56 of FIGS. 2-3 see below provided methods of FIGS. 3-5, 10-12 and 14 and below provided definitions for the terms "controller", "processor" and "module". The systems disclosed herein may be operated using numerous methods. FIGS. 3-6 illustrate a first data transfer method, which is a RDMA write method. FIG. 3 shows a portion of the first data transfer method implemented by an originating host device (host device 52) originating a work queue element (WQE) transfer process. FIG. 4 shows another portion of the first data transfer method implemented by an intermediary host device (e.g., host device 54). FIG. 5 shows another portion of the first data transfer method implemented by a terminating host device (host device 56). FIG. 6 illustrates the chain 50 of the host devices (e.g., the host devices 52, 54, 56) implementing the first data transfer method.

Although the following tasks of FIGS. 3-5 are primarily described with respect to the implementations of FIGS. 2-3 and 6, the tasks may be easily modified to apply to other implementations of the present disclosure. The tasks may be iteratively performed.

Referring now to FIG. 3, the first data transfer method may begin at 200. At 202, the WQE generation application 76 determines a distribution plan and generates WQEs for host devices involved in a corresponding distribution. Task 202 is represented by arrow A in FIG. 3. In determining the distribution plan, the WQE generation application 76 defines a distribution chain and/or a distribution tree of nodes over which data (user data, control data, and/or other information) is to be transmitted. The number and order of the nodes is determined to minimize latencies and network traffic. The nodes refer to host devise, routers, etc. over which the data is to be transmitted. Although the following tasks are described with respect to distributing the same data to multiple host devices, the tasks may include transfer of different data. The data may include user data, messages, control data, control messages, and/or other information. The WQE generation application 76 stores the WQEs in the memory 64 by transferring the WQEs to the memory controller 72 via the root complex 68 and the cache 70.

Figure 7:
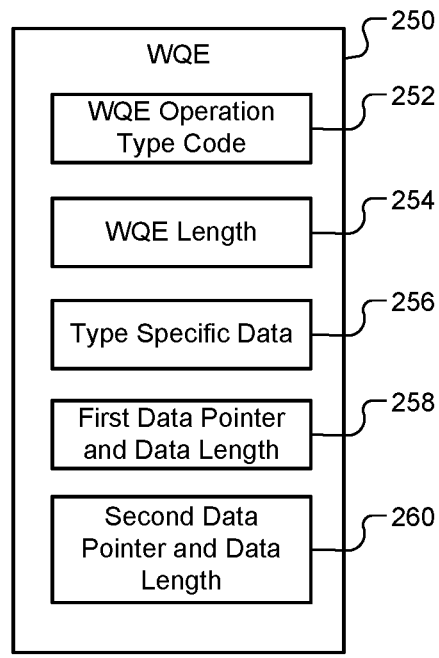
FIG. 7 is a block diagram of an example of a WQE in accordance with an embodiment of the present disclosure.

Each of the WQEs generated at 202 may include instructions to transfer data from a current node to a next downstream node. An example WQE 250 is shown in FIG. 7. The WQE 250 may include a WQE operation type code 252, a WQE length 254, type specific data 256, and one or more data pointer and data length fields (data pointer and data length fields 258, 260 are shown). The WQE operation type code 252 indicates the type of operation being performed by a local host device, such as a RDMA write operation, a RDMA read operation, a RDMA message transfer operation, etc. The WQE length 254 indicates a length of the WQE 250. The type specific data 256 indicates an address and/or location in a memory of a remote host device that is being accessed by the local host device when performing the operation corresponding to the WQE operation type code 252. The type specific data 256, for a RDMA write, may include a remote address and a memory key. The memory key may identify which application of the remote host device is to receive the written data. The memory key may include a virtual address of the application in the memory of the remote host device. The data pointers point to starting locations and/or addresses of data in a memory of the local host device. The addresses are accessed when performing the operation corresponding to the WQE operation type code 252. The data lengths indicate an amount of data to be accessed at the locations indicated by the data pointers. Multiple data pointer and data length fields allow for parallel access and transfer of multiple sets of data. The WQE 250 is provided to illustrate an example format of a WQE. Each host device may have the same or different WQE formats. Thus, the WQEs generated by the originating host device 52 may have the same or different formats.

At 204, the WQE processing application 78 of the RDMA NIC 62 reads the WQEs from the memory 82. Tasks 204 and 206 are represented by arrow B in FIG. 3. An example of the WQE processing application 78 is shown in FIG. 8 and includes a read application 270, a copy application 272, a descriptor application 274, and an ACK reception application 276. The read application 270 may read the WQEs from the memory 82.

At 206, the WQE processing application 78 and/or read application 270, based on control information in at least one of the WQEs, reads data from the memory 64. At 207, the WQE processing application 78 and/or copy application 272, based on control information in at least one of the WQEs, copies the read data to the memory 90 according to RDMA protocols. Task 207 is represented by arrow C in FIG. 3. The read data may be passed through the RDMA NIC 94, the root complex 98, the cache 100 and the memory controller 102.

At 208, the WQE processing application 78 and/or descriptor application 274, based on control information in at least one of the WQEs, writes some of the WQEs to the memory 90 according to RDMA protocols. Task 208 is represented by arrow D in FIG. 3. The WQE(s) used to perform the read and write tasks performed at 204, 206, 207, and 208 may not be written to the memory 90. Task 208 may be performed when task 207 is completed. The WQEs written in the memory 90 may include WQEs for the host device 54 and host devices downstream from the host device 54 including the host device 56. The WQEs may be passed through the RDMA NIC 94, the root complex 98, the cache 100 and the memory controller 102 prior to being stored in the memory 90.

At 210, the WQE processing application 78, subsequent to completing task 208, sends a trigger signal to the RDMA NIC 94 to process the WQEs sent to the host device 54 at 208. Task 210 is represented by arrow E in FIG. 3.

At 212, the WQE processing application 78 receives an ACK signal from one or more terminating host devices (e.g., the terminating host device 56) indicating that the data has been copied to each of the host devices in the distribution plan. The ACK signal indicates distribution of the data to the host devices in the distribution plan is completed. Task 212 is represented by arrow K in FIG. 3. The portion of the first data transfer method implemented by the originating host device 52 may end at 214.

Referring now to FIG. 4, the portion of the first data transfer method implemented by the intermediary host device 54 may begin at 220. Although the tasks of FIG. 4 are primarily described as being performed once for a single intermediary host device, the tasks of FIG. 4 may be iteratively performed by respective additional intermediary host devices.

At 222, the WQE processing application 108 of the RDMA NIC 94 of the intermediary host device 54 receives the data and stores the data in the memory 90 according to RDMA protocols and independent of the core 96. Task 222 is represented by arrow C in FIG. 3. At 224, the WQE processing application 108, subsequent to task 222, receives the WQEs sent to the intermediary host device 54 and stores the WQEs in the memory 90 according to RDMA protocols and independent of the core 96. Task 224 is represented by arrow D in FIG. 3.

At 226, the WQE processing application 108 receives a trigger signal from a previous (or upstream) host device, such as the trigger signal generated by the originating host device 52. Task 226 is represented by arrow E in FIG. 3. At 228, the WQE processing application 108 and/or a corresponding read application reads the WQEs stored in the memory 90. Tasks 228 and 229 are represented by arrow F in FIG. 3.

At 229, the WQE processing application 108 and/or a corresponding read application, based on control information in at least one of the WQEs read at 228, reads data from the memory 90. At 230, the WQE processing application 108 and/or a corresponding copy application, based on control information in at least one of the WQEs, copies the read data to the memory 124 according to RDMA protocols. Task 230 is represented by arrow G in FIG. 3. The read data may be passed through the RDMA NIC 122, the root complex 128, the cache 130 and the memory controller 132.

At 232, the WQE processing application 108 and/or a corresponding descriptor application, based on control information in at least one of the WQEs, writes some of the WQEs to the memory 124 according to RDMA protocols. Task 232 is represented by arrow H in FIG. 3. The WQE(s) used to perform the read and write tasks performed at 228, 229, 230, and 232 may not be written to the memory 124. Task 232 may be performed when task 230 is completed. The WQEs written in the memory 124 may include WQEs for the host device 56. The WQEs may be passed through the RDMA NIC 122, the root complex 128, the cache 130 and the memory controller 132 prior to being stored in the memory 124.

At 234, the WQE processing application 108, subsequent to completing task 232, sends a trigger signal to the RDMA NIC 122 to process the WQEs sent to the host device 56 at 232. Task 234 is represented by arrow I in FIG. 3. Tasks 228-234 may be performed subsequent to task 210 of FIG. 3 and prior to task 260 of FIG. 5. The portion of the first data transfer method implemented by the intermediary host device 54 may end at 236.

Referring now to FIG. 5, the portion of the first data transfer method implemented by the terminating host device 56 may begin at 250. At 252, the WQE processing application 137 of the RDMA NIC 122 of the terminating host device 56 receives the data and stores the data in the memory 124 according to RDMA protocols and independent of the core 126. Task 252 is represented by arrow G in FIG. 3.

At 254, the WQE processing application 137, subsequent to task 252, receives the WQEs sent to the terminating host device 56 and stores the WQEs in the memory 124 according to RDMA protocols and independent of the core 126. Task 254 is represented by arrow H in FIG. 3.

At 256, the WQE processing application 137 receives a trigger signal from a previous (or upstream) host device, such as the trigger signal generated by the intermediary host device 54. Task 256 is represented by arrow I in FIG. 3.

At 258, the WQE processing application 137 and/or a corresponding read application reads the WQEs stored in the memory 124. Task 258 is represented by arrow J in FIG. 3. At 260, the WQE processing application 137, based on one of the WQEs, generates an ACK signal acknowledging receipt of the data. At 262, the RDMA NIC 122 transmits the ACK signal to the RDMA NIC 62 of the originating host device 52. This transmission is represented by arrow K of FIG. 3.

Tasks 260-262 may be performed subsequent to task 234 of FIG. 4 and prior to task 212 of FIG. 3. The portion of the first data transfer method implemented by the terminating host device 56 may end at 264.

The above-described tasks of FIGS. 3-5 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 9:
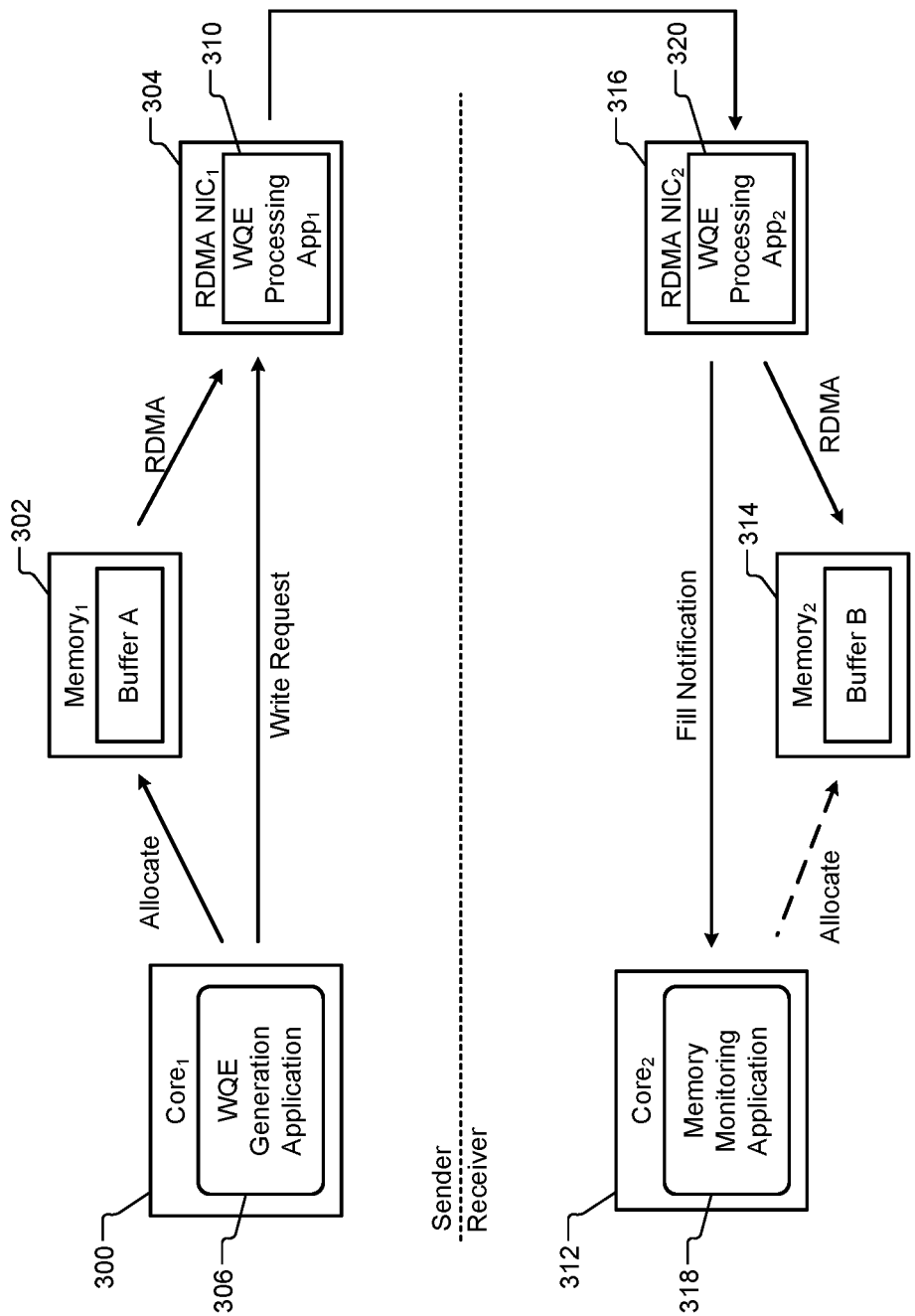
FIG. 9 is a functional block diagram of an example of a RDMA data transfer event in accordance with an embodiment of the present disclosure.

FIG. 9 shows a RDMA data transfer event implemented by a sender sending data to a receiver. Transfer events, such as data transfer events, WQE transfer events, and message transfer events, described herein may be implemented similarly to the RDMA data transfer event of FIG. 9. The sender may be a first host device and the receiver may be a second host device. The sender includes a core 300, a memory 302, and a RDMA NIC 304. The core 300 includes a WQE generation application 306. The memory 302 includes a buffer A. The RDMA NIC 304 includes a WQE processing application 310. The receiver includes a core 312, a memory 314, and a RDMA NIC 316. The core 312 includes a memory monitoring application 318. The memory 314 includes a buffer B. The RDMA NIC 316 includes a WQE processing application 320.

In operation, the core 300 sends data from the buffer A to the buffer B via the RDMA NICs 304, 316 according to RDMA protocols. This may include the WQE generation application 306 generating a first WQE and a second WQE and storing the WQEs in the memory 302. The WQE generation application 306 may send a write request signal to the RDMA NIC 304 to read the WQEs in the memory 302 associated with writing the data from buffer A to buffer B. The WQE generation application may allocate addresses in the memory 302 for the data and/or the WQEs and indicate the addresses via the write request signal and/or the first WQE.

The RDMA NIC 304 receives the write request signal and reads the WQEs. Based on the first WQE, the RDMA NIC 304 copies the data from the buffer A to the RDMA NIC 316 and sends the second WQE to the RDMA NIC 316. The WQE processing application 320, based on the second WQE stores the data in the buffer B. The data is stored in the buffer B independent of the core 312. The WQE processing application 320 may send a fill notification signal to the memory monitoring application 318 indicating the data is stored in buffer B. The memory monitoring application 318 may allocate one or more addresses in the memory 314 for storing data received from the core 300. The addresses may be indicated to the memory 314 and/or the RDMA NIC 316. In one embodiment, this allocation is performed by the WQE processing application 320 or the memory 314 and not by the memory monitoring application 318.

The above-described examples provide hardware distributing the same data to multiple host devices while minimizing time per hop from one node to the next node. The examples also minimize processor overhead, especially for host devices downstream from an originating host device. A core of an originating host device performs a limited amount of work to generate and execute a distribution plan and may only send data and WQEs to a single host device downstream from the originating host device. Cores of host devices downstream of the originating host device are not involved in the distribution. The examples provide reliable single-sided multicast distribution methods. Single-sided meaning only the originating host device is involved in generating WQEs. Other multicast examples are set forth below.

VARIANTS

Although the data and the WQEs referred to herein are primarily described as being stored in the memories (e.g., memories 64, 90, 124 of FIG. 2) of host devices, the data and/or WQEs may be stored in RDMA NICs (e.g., the RDMA NICs 62, 94, 122 of FIG. 2). This eliminates storing the data and/or WQEs in the memories and later reading the WQEs from the memories. Thus, the RDMA NICs may have respective memories for storing the data and WQEs. In one embodiment, during a utility power outage, the data stored in the RDMA NICs and/or caches (e.g., caches 70, 100, 130 of FIG. 2) of the host devices is flushed to the memories. The RDMA NICs, root complexes, caches, memory controllers, and memories of the host devices receive battery power, which allows for the data to be flushed. The battery power may be received from batteries in power supplies (e.g., power supplies 22 of FIG. 1) of corresponding racks.

In another embodiment, one or more host devices downstream from an originating host device may generate template control descriptors, which are pre-defined partial WQEs. In certain situations, the originating host device or an intermediary host device may not know certain operational aspects of a downstream host device. The downstream host devices may generate template control descriptors that are partially filled with information to perform a RDMA write, a RDMA read, a message transfer, and/or other operational task. The information may include commands or codes to access memory, physical addresses of memory, specific protocols, host specific commands, and/or other information. The originating host device or an upstream host device may generate WQEs and/or fill-in information in WQEs to provide the remaining information missing from the template control descriptors. An intermediary host device may fill in certain information of a WQE for a downstream host device, where the WQE is received from a host device upstream from the intermediary host device.

The generation of template control descriptors allows downstream host devices to determine some of the content of the WQEs. In one embodiment, an intermediary host device generates a template control descriptor that includes information to direct or redirect flow of data along a distribution chain. For example, the template control descriptor may indicate the next and/or following host devices for which data is to be copied. The template control descriptor may include the addresses and/or order of the addresses of the next host devices. An example data transfer method, including generation of template control descriptors, is described below with respect to FIGS. 10-13.

FIGS. 10-12 illustrate a second data transfer method, which is a RDMA write method. FIG. 10 shows a portion of the second data transfer method implemented by a sending host device (host device 52) originating a partial (or incomplete) WQE transfer process. Partial WQEs are generated and transferred. FIG. 11 shows a portion of the second data transfer method implemented by an intermediary host device (e.g., host device 54) generating one or more template control descriptors. FIG. 12 shows a portion of the second data transfer method implemented by a terminating host device (e.g., host device 56), which may generate one or more template control descriptors. FIG. 13 illustrates a chain 400 of host devices (e.g., the host devices 52, 54, 56) implementing the first data transfer method.

Although the following tasks of FIGS. 10-12 are primarily described with respect to the implementations of FIGS. 2-3 and 13, the tasks may be easily modified to apply to other implementations of the present disclosure. The tasks may be iteratively performed. Although the tasks are primarily described with respect to generation of partial WQEs, full (or completed) WQEs as described above may also be generated.

Referring now to FIG. 10, the first data transfer method may begin at 420. At 422, the WQE generation application 76 determines a distribution plan and generates full WQEs and partial WQEs for host devices involved in a corresponding distribution. Task 422 is represented by arrow B in FIG. 13. In determining the distribution plan, the WQE generation application 76 defines a distribution chain and/or a distribution tree of nodes over which data (user data, control data, and/or other information) is to be transmitted. The number and order of the nodes is determined to minimize latencies and network traffic. The nodes refer to host devices, routers, etc. over which the data is to be transmitted. Although the following tasks are described with respect to distributing the same data to multiple host devices, the tasks may include transfer of different data. The data may include user data, messages, control data, control messages, and/or other information.

The WQE generation application 76 generates the full WQEs for the originating host device 52 to copy and transfer data and partial WQEs to the intermediary host device 54. The WQE generation application 76 writes specific information of the partial WQEs not provided in template control descriptors generated by downstream host devices, as described in below tasks 452, 482 of FIGS. 11-12. For example, the specific information may include a length of data being stored and/or a data pointer. As an example, the partial WQEs may not include type specific data, such as remote addresses of downstream host devices and/or memory keys. In an embodiment, a partial WQE includes a "go" bit that is set. The "go" bit indicates to the corresponding downstream host device, receiving the partial WQE, to proceed with implementing the information included in the corresponding template control descriptor. The WQE generation application 76 stores the full WQE and partial WQEs in the memory 64 by transferring the WQEs to the memory controller 72 via the root complex 68 and the cache 70.

At 424, the WQE processing application 78 of the RDMA NIC 62 reads the full WQEs and the partial WQEs from the memory 82. Tasks 424 and 426 are represented by arrow C in FIG. 13. At 426, the WQE processing application 78 and/or read application 270, based on control information in at least one of the full WQEs, reads data from the memory 64. At 427, the WQE processing application 78 and/or copy application 272, based on control information in at least one of the full WQEs, copies the read data to the memory 90 according to RDMA protocols. Task 427 is represented by arrow D in FIG. 13. The read data may be passed through the RDMA NIC 94, the root complex 98, the cache 100 and the memory controller 102 prior to being stored in the memory 90.

At 428, the WQE processing application 78 and/or descriptor application 274, based on control information in at least one of the full WQEs, writes some of the partial WQEs to the memory 90 according to RDMA protocols. Task 428 is represented by arrow E in FIG. 13. The full WQE(s) used to perform the read and write tasks performed at 424, 426, 427, and 428 may not be written to the memory 90. Task 428 may be performed when task 427 is completed. The partial WQEs written in the memory 90 may include partial WQEs for the host device 54 and host devices downstream from the host device 54 including the host device 56. The partial WQEs may be passed through the RDMA NIC 94, the root complex 98, the cache 100 and the memory controller 102 prior to being stored in the memory 90.

At 430, the WQE processing application 78, subsequent to completing task 428, sends a trigger signal to the RDMA NIC 94 to process the partial WQEs sent to the host device 54 at 428. Task 430 is represented by arrow F in FIG. 13.

At 432, the WQE processing application 78 receives an ACK signal from one or more terminating host devices (e.g., the terminating host device 56) indicating that the data has been copied to each of the host devices in the distribution plan. Task 432 is represented by J in FIG. 13. The portion of the first data transfer method implemented by the originating host device 52 may end at 434.

Referring now to FIG. 11, the portion of the second data transfer method implemented by the intermediary host device 54 may begin at 450. Although the tasks of FIG. 11 are primarily described as being performed once for a single intermediary host device, the tasks of FIG. 11 may be iteratively performed by respective additional intermediary host devices.

At 452, a partial WQE generation module 453 of the core 96 of the intermediary host device 54 performs preparatory work including generating template control descriptors (or pre-defined partial WQEs). The template control descriptors, as described above, may include information specific to the intermediary host device 54 and/or other information that is not provided in partial WQEs generated by the originating host device 52 for the intermediary host device 54. Task 452 is represented by arrow A1 in FIG. 13.

At 454, the WQE processing application 108 of the RDMA NIC 94 of the intermediary host device 54 receives the data and stores the data in the memory 90 according to RDMA protocols and independent of the core 96. Task 454 is represented by arrow D in FIG. 13. At 456, the WQE processing application 108, subsequent to task 454, receives the partial WQEs sent to the intermediary host device 54 and stores the partial WQEs in the memory 90 according to RDMA protocols and independent of the core 96. Task 456 is represented by arrow E in FIG. 13.

At 458, the WQE processing application 108 receives a trigger signal from a previous (or upstream) host device, such as the trigger signal generated by the originating host device 52. Task 458 is represented by arrow F in FIG. 13. At 460, the WQE processing application 108 and/or a corresponding read application reads the partial WQEs stored in the memory 90 and completes corresponding template control descriptors generated at 452. Each of the partial WQEs may include a field that identifies a corresponding one of the template control descriptors. Some or all of the template control descriptors may be completed to create full WQEs. Tasks 460 and 462 are represented by arrow G in FIG. 13.

At 462, the WQE processing application 108 and/or a corresponding read application, based on control information in at least one of the completed template control descriptors or a full WQE, reads data from the memory 90. At 464, the WQE processing application 108 and/or a corresponding copy application, based on control information in at least one of the completed template control descriptors or a full WQE, copies the read data to the memory 124 according to RDMA protocols. Task 464 is represented by arrow H in FIG. 13. The read data may be passed through the RDMA NIC 122, the root complex 128, the cache 130 and the memory controller 132 prior to being stored in the memory 124.

At 466, the WQE processing application 108 and/or a corresponding descriptor application, based on control information in at least one of the completed template control descriptors or a full WQE, writes some of the partial WQEs to the memory 124 according to RDMA protocols. Task 466 is represented by arrow I in FIG. 13. The partial WQE(s) used to perform the read and write tasks performed at 460, 462, 464, and 466 may not be written to the memory 124. Task 466 may be performed when task 464 is completed. The partial WQEs written in the memory 124 may include partial WQEs for the host device 56. The partial WQEs may be passed through the RDMA NIC 122, the root complex 128, the cache 130 and the memory controller 132 prior to being stored in the memory 124.

At 468, the WQE processing application 108, subsequent to completing task 466, sends a trigger signal to the RDMA NIC 122 to process the WQEs sent to the host device 56 at 466. Task 464 is represented by arrow J in FIG. 13. Tasks 460-468 may be performed subsequent to task 430 of FIG. 13 and prior to task 492 of FIG. 12. The portion of the second data transfer method implemented by the intermediary host device 54 may end at 470.

Referring now to FIG. 12, the portion of the second data transfer method implemented by the terminating host device 56 may begin at 480. At 482, a partial WQE generation module 483 of the core 126 of the terminating host device 56 performs preparatory work including generating template control descriptors (or pre-defined partial WQEs). The template control descriptors, as described above, may include information specific to the terminating host device 56 and/or other information that is not provided in partial WQEs generated by the originating host device 52 for the terminating host device 56. Task 482 is represented by arrow A2 in FIG. 13.

At 484, the WQE processing application 137 of the RDMA NIC 122 of the terminating host device 56 receives the data and stores the data in the memory 124 according to RDMA protocols and independent of the core 126. Task 484 is represented by arrow H in FIG. 13.

At 486, the WQE processing application 137, subsequent to task 484, receives the partial WQEs sent to the terminating host device 56 and stores the partial WQEs in the memory 124 according to RDMA protocols and independent of the core 126. Task 486 is represented by arrow I in FIG. 13.

At 488, the WQE processing application 137 receives a trigger signal from a previous (or upstream) host device, such as the trigger signal generated by the intermediary host device 54. Task 488 is represented by arrow J in FIG. 13.

At 490, the WQE processing application 137 and/or a corresponding read application reads the partial WQEs stored in the memory 124 and completes corresponding template control descriptors generated at 482 to generate full WQEs. Each of the partial WQEs may include a field that identifies a corresponding one of the template control descriptors. Task 490 is represented by arrow K in FIG. 13. At 492, the WQE processing application 137, based on at least one of the completed template control descriptors or a full WQE, generates an ACK signal acknowledging receipt of the data. At 494, The RDMA NIC 122 transmits the ACK signal to the RDMA NIC 62 of the originating host device 52. This transmission is represented by arrow L of FIG. 13.

Tasks 492-494 may be performed subsequent to task 468 of FIG. 11 and prior to task 432 of FIG. 10. The portion of the second data transfer method implemented by the terminating host device 56 may end at 496.

The above-described tasks of FIGS. 10-12 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

In another embodiment, not all of the same data to be sent is transmitted during each data transfer event. The data may be segmented into respective portions, which are transmitted in a sequential manner. WQEs may be generated respectively for the portions. As another example, a message may be segmented into sub-messages and WQEs may be generated for the sub-messages.

The segmentation of data and/or a message allows for (i) a second portion of data to start being transmitted prior to transmission of a first portion of data being completed, and/or (ii) a second sub-message to be transmitted prior to transmission of a first sub-message being completed. Transmission of the second portion of data and/or the second sub-message may begin (i) prior to an intermediary host device beginning and/or completing transmission of the first portion of data and/or the first sub-message, (ii) prior to a terminating host device receiving the first portion of data and/or the first sub-message, and/or (iii) prior to the terminating host device generating an ACK signal for the first portion of data or the first sub-message.

When data is not segmented and/or when data is fully distributed along a distribution chain prior to a distribution of next data occurs, latency L associated with each distribution may be represented by equation 1. S is size (or length) of the data being distributed. BW is bandwidth. H is a number of hops in a chain from an originating host device to a terminating host device. MD is a minimal propagation delay from the originating host device to the terminating host device.

$$L = \frac{S}{BW} \cdot H + MD \quad (1)$$

By performing segmentation and sending a second segment prior to completing distribution of a whole first segment, the latency may be reduced to the latency represented by equation 2.

$$L = \frac{S}{BW} + MD \quad (2)$$

In another embodiment, an originating host device and/or RDMA NIC of the originating host device may initiate a timer when distributing data (or a message). The RDMA NIC or other module of the originating host device (e.g., the core of the originating host device) may perform a recovery process when the data is not completely distributed within a predetermined period of the timer. When a timeout occurs (i.e. the predetermined period has lapsed since beginning transmission of the data), the RDMA NIC attempts to recover the corresponding distribution chain to a defined state. The RDMA NIC attempts to determine which host devices have reliably received the data and which host devices have not reliably received the data. As an example, the RDMA NIC directly contacts each host device involved in the distribution and verifies whether the host device received the data. The originating host device sends the data directly to the host devices that did not receive the data.

As another example and when the timer times out, the originating host device directly contacts each of the host devices involved in the distribution to remove any of the data from corresponding memories and/or received WQEs associated with the distribution. In one embodiment, this removal occurs for all of the WQEs downstream from the originating host device. In another embodiment, this removal may occur in host devices that did not receive all of the data and/or did not complete execution of a WQE. This removal may not occur for host devices that received all of the data. The removal of the WQEs prevents any "ghost" messages and/or WQEs from existing in the chain. A ghost message and/or WQE is a message and/or WQE that was sent during an incomplete distribution and has been retransmitted, such that two of the same message and/or WQE exist at a same point in the chain. The above-described removal and verification processes may be combined.

In another embodiment and when the timer times out, the originating host device may broadcast an abort message via the RDMA NIC to the hosts devices involved in the distribution to cease processing of received WQEs and/or nullify (or ignore) previously received data and/or WQEs. Transmission of the abort message may be sent during the above-described removal and verification processes.

In another embodiment, some of the WQEs generated by a host device may target a memory that is not located at a host device in a corresponding distribution chain, but rather targets a memory that is remote from and accessible to one of the host devices in the distribution chain. As an example, a RDMA NIC may communicate with a root complex using a NVM express (NVMe) or non-volatile memory host controller interface specification (NVMHCI) to access non-volatile storage media attached to the root complex via a PCIe bus.

Figure 14:
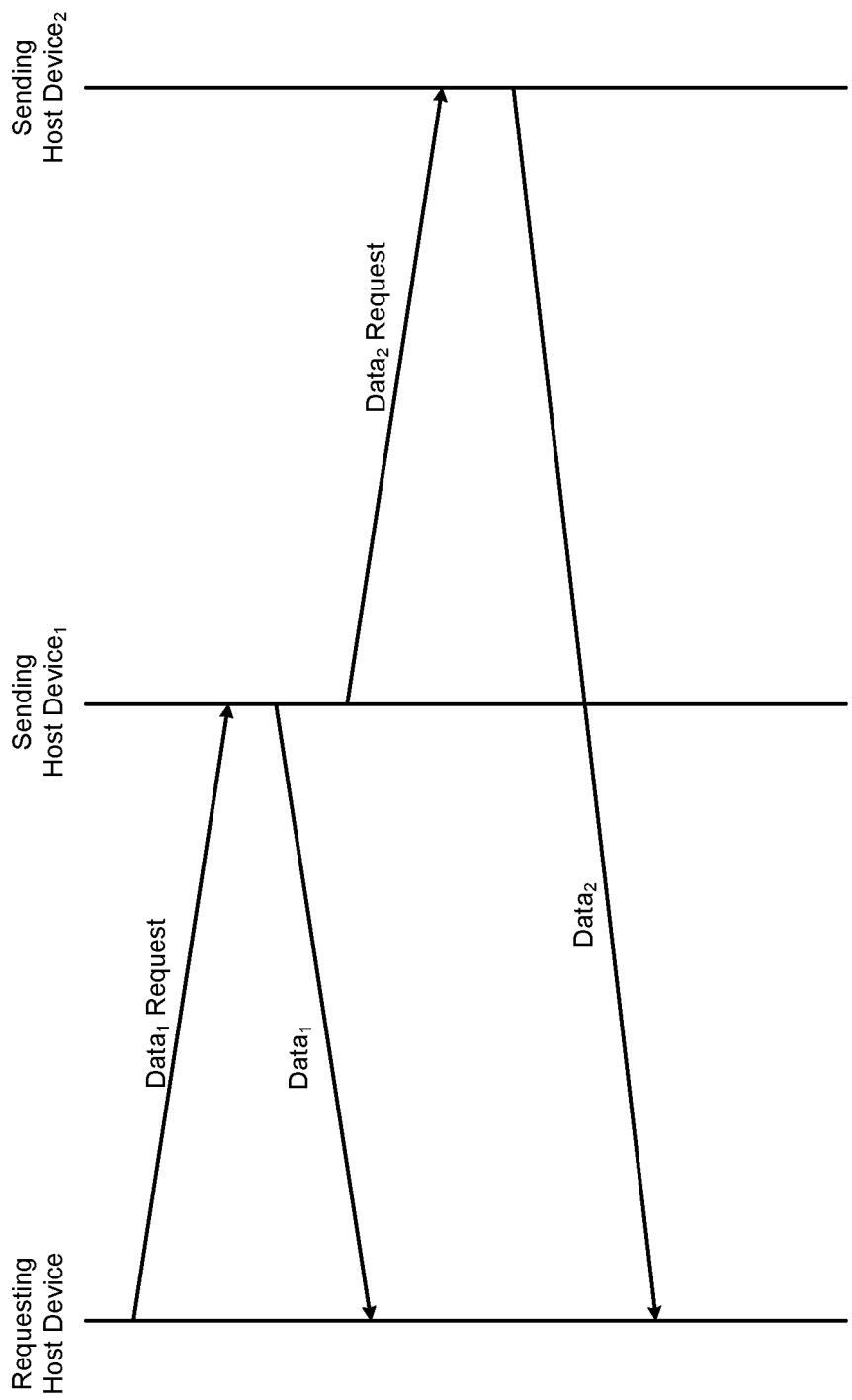
FIG. 14 illustrates a third data transfer method including segmented reading of data from host devices in accordance with an embodiment of the present disclosure.

FIG. 14 shows a third data transfer method including segmented reading of data from host devices. The third data transfer method is a RDMA read method. The above-described RDMA write methods may be modified to perform a RDMA read of data from multiple host devices. This may include an originating host device (e.g., requesting host device in FIG. 14) collecting data, portions of data, messages, and/or portions of messages from multiple host devices (e.g., sending host devices$_{1-2}$ of FIG. 14) in a distribution chain and/or tree. The third data transfer method is performed while avoiding a large amount of incast traffic to the originating host device during a same period and while achieving a maximum bandwidth.

In the following described example, portions of data are stored in respective host devices downstream from an originating host device. The originating host device collects and processes the portions of data. The processed data may be, for example, displayed and/or transmitted to a network device remote from the originating host device. The originating host device stores key values, which may be hashed to identify: downstream host devices; addresses of RDMA NICs of the downstream host devices; addresses of memories of the downstream host devices; and/or other identifiers of where data is stored and is to be accessed by the downstream host devices.

The originating host device collects the key values associated with the RDMA read. Instead of sending out request messages directly to the downstream host devices, which can cause the originating host device to receive the portions of the data during a same period, the originating host device generates WQEs. Some of the WQEs are sent from the RDMA NIC of the originating host device to a next downstream (or intermediary) host device (e.g., sending host device$_1$ of FIG. 14). A WQE processing application of a RDMA NIC of the intermediary host device (i) processes the sent WQEs, (ii) sends a first portion of the data to the originating host device based on a read request in a first WQE, and (iii) sends a portion of the sent WQEs to a next downstream (in the example shown a terminating) host device (e.g., sending host device$_2$). A WQE processing application of a RDMA NIC of the terminating host device (i) processes the portion of WQEs or WQEs received by the RDMA NIC of the terminating host device, and (ii) sends a second portion of the data directly to the originating host device based on a second read request in one of the WQEs received by the RDMA NIC of the terminating host device. This process may occur for any number of host devices in the distribution chain and/or tree.

Transmission of the second portion of the data from the terminating host device to the originating host device may begin (i) prior to completion of transmission of the first portion of the data from the intermediary host device to the originating host device, or (ii) subsequent to the transmission of the first portion of the data from the intermediary host device to the originating host device.

The above-described examples allow for consistent tail chain replication. This includes beginning a write at an originating host device of a chain and beginning a read at a terminating host device of the chain. Cores of host devices downstream from the originating host device are not involved in the write and read events. The write events may be performed as described with respect to the methods of FIGS. 3-5 and 10-12. The read events may be performed as described with respect to the method of FIG. 14.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the terms "module", "processor" and/or "controller" may be replaced with the term "circuit." The term terms "module", "processor" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

A module, processor and/or controller may include one or more interface circuits. In some examples, the interface circuits may include wired or wireless interfaces that are connected to a local area network (LAN), the Internet, a wide area network (WAN), or combinations thereof. The functionality of any given module, processor and/or controller of the present disclosure may be distributed among multiple module, processor and/or controller that are connected via interface circuits. For example, multiple modules may provide load balancing. In a further example, a server (also known as remote, or cloud) module may accomplish some functionality on behalf of a client module and/or client station.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An originating host device in a distribution chain upstream from a plurality of host devices, wherein the plurality of host devices comprises an intermediary host device and a terminating host device, the originating host device comprising:
   a core comprising a generation application, wherein the generation application is configured such that the core of the originating host device (i) determines a plan for transferring data between the originating host device and the plurality of host devices, and (ii) generates a plurality of work queue elements (WQEs) to implement the plan, the WQEs including an operation to be performed, a memory address of the intermediary or the terminating host device to perform the operation on, and a memory address of the originating host device to access in performing the operation; and
   a first remote direct memory access (RDMA) network interface card (NIC) comprising
      a read application configured such that the first RDMA NIC reads the plurality of WQEs from a first memory,
      a descriptor application configured such that the first RDMA NIC (i) remote direct memory accesses a second memory of the intermediary host device including writing a first portion of the WQEs directly from the first RDMA NIC to the second memory, and (ii) after writing the first portion of the WQEs, provides a signal that triggers a second RDMA NIC of the intermediary host device to process the first portion of the WQEs stored in the second memory, and
      a reception application configured such that the first RDMA NIC receives an acknowledgement signal or a portion of the data from the terminating host device, wherein the acknowledgement signal indicates transfer of the data is completed.

2. The originating host device of claim 1, wherein:
   the generation application is configured such that the core of the originating host device determines the plan for distributing the data to the plurality of host devices in the distribution chain;
   the first RDMA NIC comprises a copy application, wherein the copy application is configured such that the first RDMA NIC direct memory accesses the second memory of the intermediary host device including copying the data from the first memory to the second memory, wherein the data is identified in some of the plurality of WQEs; and the reception application is configured such that the first RDMA NIC receives the acknowledgement signal from the terminating host device, wherein the acknowledgement signal indicates a last hop has been reached in the distribution chain and distribution of the data to the plurality of host devices is completed.

3. The originating host device of claim 1, comprising the first memory.

4. The originating host device of claim 1, wherein the first memory is separate from the originating host device and is accessed by the first RDMA NIC via a peripheral component interconnect express interface.

5. The originating host device of claim 1, wherein:

a second portion of the plurality of WQEs are partial WQEs;

the partial WQEs correspond respectively to template control descriptors;

the template control descriptors are generated by the plurality of host devices; and each of the partial WQEs (i) comprises information not included in a corresponding one of the template control descriptors, and (ii) completes the corresponding one of the template control descriptors to provide a full WQE.

6. The originating host device of claim 5, wherein the first portion of the plurality of WQEs includes at least one of the second portions of the plurality of WQEs.

7. The originating host device of claim 1, wherein:

the generation application is configured such that the core of the originating host device determines the plan for collecting the data from the plurality of host devices in the distribution chain;

the portion of WQEs comprises a first WQE and a second WOE;

the portion of the data received by the reception application is a first portion of the data; and the reception application is configured such that the first RDMANIC (i) receives a second portion of the data from the intermediary host device based on the first WQE, and (ii) receives the first portion of the data from the terminating host device based on the second WQE.

8. The originating host device of claim 1, wherein the data comprises user data or control messages.

* * * * *